(12) United States Patent
Zhu et al.

(10) Patent No.: US 12,467,794 B2
(45) Date of Patent: Nov. 11, 2025

(54) BLUETOOTH TEMPERATURE MEASURING PROBE

(71) Applicant: SHENZHEN KUKI ELECTRONIC CO., LTD., Guangdong (CN)

(72) Inventors: Rongyuan Zhu, Guangdong (CN); Hengshou Qiu, Guangdong (CN)

(73) Assignee: SHENZHEN KUKI ELECTRONIC CO., LTD., Guangdong (CN)

( * ) Notice: Subject to any disclaimer, the term of this patent is extended or adjusted under 35 U.S.C. 154(b) by 344 days.

(21) Appl. No.: 18/128,317

(22) Filed: Mar. 30, 2023

(65) Prior Publication Data

US 2024/0201018 A1   Jun. 20, 2024

Related U.S. Application Data

(63) Continuation of application No. PCT/CN2023/071221, filed on Jan. 9, 2023.

(30) Foreign Application Priority Data

Dec. 16, 2022   (CN) .................. 202211625359.9

(51) Int. Cl.
*G01K 1/024* (2021.01)

(52) U.S. Cl.
CPC ......... *G01K 1/024* (2013.01); *G01K 2207/06* (2013.01)

(58) Field of Classification Search
CPC ...... G01K 1/024; G01K 2207/06; G01K 1/08; G01K 13/20; G01K 1/00; G01K 13/00; H01Q 1/2291; H01Q 1/38; H01Q 1/526; H01Q 1/48; Y02D 30/70; H02J 7/0042
See application file for complete search history.

(56) References Cited

U.S. PATENT DOCUMENTS

| | | |
|---|---|---|
| 6,259,417 B1 | 7/2001 | Kim et al. |
| 11,378,462 B2 * | 7/2022 | Wu .......................... G01K 1/08 |
| 11,982,578 B2 * | 5/2024 | Huang ..................... G01K 7/18 |

(Continued)

FOREIGN PATENT DOCUMENTS

| | | |
|---|---|---|
| CN | 106197707 A | 12/2016 |
| CN | 107314826 A | 11/2017 |

(Continued)

OTHER PUBLICATIONS

International Search Report of Corresponding Application PCT/CN2023/071221, mailed Mar. 24, 2023, 4 pages.

(Continued)

*Primary Examiner* — John E Breene
*Assistant Examiner* — Janice M Soto
(74) *Attorney, Agent, or Firm* — Cooper Legal Group, LLC (57) ABSTRACT

The present application relates to a Bluetooth temperature measuring probe including a needle tube, a handle, a first temperature sensor and a PCB board, in which the first temperature sensor and the PCB board are both provided in the needle tube; the handle is fixedly connected to the needle tube at a tail end thereof; the Bluetooth temperature measuring probe further includes a ceramic antenna provided inside the needle tube and the handle and having a head end extending into the needle tube and being electrically connected to the PCB board and a tail end extending into the handle to receive and transmit a signal, so as to realize an antenna function.

8 Claims, 6 Drawing Sheets

(56) References Cited

U.S. PATENT DOCUMENTS

| | | | | |
|---|---|---|---|---|
| 2006/0139214 A1* | 6/2006 | Deng | .................... | H01Q 1/243 |
| | | | | 343/702 |
| 2015/0077296 A1 | 3/2015 | An et al. | | |
| 2016/0377490 A1 | 12/2016 | Nivala et al. | | |
| 2019/0339133 A1* | 11/2019 | Pulvermacher | ........ | G01K 1/022 |
| 2020/0096393 A1* | 3/2020 | Lion | ........................ | G01K 3/10 |
| 2022/0049992 A1* | 2/2022 | Nivala | ................... | G01K 1/024 |
| 2022/0333997 A1* | 10/2022 | Newhouse | ............... | G01K 1/12 |

FOREIGN PATENT DOCUMENTS

| | | | | | |
|---|---|---|---|---|---|
| CN | 211205567 U | | 8/2020 | | |
| CN | 212030751 U | | 11/2020 | | |
| CN | 113483909 A | * | 10/2021 | ............... | G01K 7/16 |
| CN | 215865557 U | | 2/2022 | | |
| CN | 114878011 A | | 8/2022 | | |
| CN | 217442708 U | | 9/2022 | | |
| CN | 217605148 U | | 10/2022 | | |
| DE | 102021129787 A1 | * | 7/2022 | ........... | H05B 6/6467 |
| WO | WO-2018205228 A1 | * | 11/2018 | ............... | G01K 7/22 |

OTHER PUBLICATIONS

Moon, Jung-Ick, et al., "The Design of Small Size Chip Ceramic Dielectric Antenna for Bluetooth Application", IEEE Antennas and Propagation Society International Symposium, Jun. 22, 2003, pp. 954-957, vol. 2, XP032413365, DOI: 10.1109/APS.2003.1219393 ISBN: 978-0-7803-7846-9.

First Office Action received in corresponding Canadian Patent Application No. 3,194,896, dated Aug. 23, 2024, 5 pages.

Corresponding European Intellectual Property Office Application No. 23711928.4, Office Action dated Jun. 17, 2025, 5 pages.

Corresponding Chinese Intellectual Property Office Application No. 202211625359.9, Office Action dated Jul. 31, 2025, 6 pages.

* cited by examiner

BLUETOOTH TEMPERATURE MEASURING PROBE

CROSS-REFERENCE TO RELATED APPLICATIONS

This application is a continuation of PCT application serial no. PCT/CN2023/071221, filed on Jan. 9, 2023, which claims the priority and benefit of Chinese patent application no. 202211625359.9, filed on Dec. 16, 2022. The entireties of PCT application serial no. PCT/CN2023/071221 and Chinese patent application no. 202211625359.9 are hereby incorporated by reference herein and made a part of this specification.

TECHNICAL FIELD

The present application relates to the technical field of temperature measuring device, and particularly to a temperature measuring probe.

BACKGROUND ART

With the development of people's living standards, the requirement for food is increasingly increased. The temperature measuring probe with BLUETOOTH® connectivity is applied more and more widely. The temperature measuring probe with the BLUETOOTH® connectivity can be pierced into the food to directly measure a temperature, so internal temperature data of the food can be checked conveniently by users in real time, thereby assisting in realizing an intelligent cooking.

The current temperature measuring probe with the BLUETOOTH® connectivity generally includes a needle tube, a handle, a temperature sensor, a PCB board, a module with the BLUETOOTH® connectivity, an antenna, and a power-supply module, in which the needle tube is made of metal material and has a good thermal conductivity, and the temperature sensor tests the temperature of the needle tube and transmits temperature signals to an external receiving terminal through the module with the BLUETOOTH® connectivity and the antenna. However, the temperature measuring probe with the BLUETOOTH® connectivity needs to contact high temperature frequently, and the antenna generally adopts a form of FPC, please make reference to China patent application with a publication no. of CN212030751U and a title of "a Four-wire barbecue thermometer with BLUETOOTH®" for the detail, a performance of the FPC antenna is easy to be influenced under prolonged high temperature condition, and the FPC antenna has a short service life and needs to be improved.

SUMMARY

In order to solve a technical problem that the current temperature measuring probe with a BLUETOOTH® connectivity adopts a FPC antenna, so the antenna has an unstable performance under prolonged high temperature condition and has a short service life, the present application provides a temperature measuring probe with the BLUETOOTH® connectivity.

The temperature measuring probe with the BLUETOOTH® connectivity provided by the present application adopts the following technical solution: the temperature measuring probe with the BLUETOOTH® connectivity includes a needle tube, a handle, a first temperature sensor and a PCB board, in which the first temperature sensor and the PCB board are both provided in the needle tube; and the handle is fixedly connected to a tail end of the needle tube; the temperature measuring probe with the BLUETOOTH® connectivity further includes a ceramic antenna provided inside the needle tube and the handle and having a head end extending into the needle tube and being electrically connected to the PCB board and a tail end extending into the handle to receive and transmit a signal, so as to realize an antenna function.

By adopting the above technical solution, the present application adopts the ceramic antenna to replace the current FPC antenna. The ceramic antenna has an advantage of high temperature resistance, and is able to work under a high temperature condition for a long time, but still ensures a work stability. Further, the ceramic antenna has advantages of high gain and high sensitivity. The ceramic antenna has a head end extending into the needle tube and being electrically connected to the PCB board and a tail end extending into the handle. Moreover, the handle is generally made of materials with poor shielding effect such as ceramic, so as to avoid a great influence on receiving and transmitting signals of the ceramic antenna for realizing the antenna function.

In some embodiments, the temperature measuring probe with the BLUETOOTH® connectivity further includes a shielding tube, and the shielding tube is arranged inside the needle tube and the handle and sleeved on the antenna; and has a head end extending into the needle tube and a tail end extending into the handle; and the tail end of the ceramic antenna extends beyond the shielding tube to receive and transmit a signal, so as to realize the antenna function.

By adopting the above technical solution, the shielding tube plays a role of ground in an antenna system. A length of the antenna part that functions can be changed by adjusting a length of the shielding tube, thereby the performance of the antenna is changed, so that the antenna achieves a high efficiency and a good consistency.

In some embodiments, the shielding tube has a cross-section shape of a circle, an oval or a polygon, and the shielding tube is a stainless steel shielding tube, a copper shielding tube or an aluminum shielding tube.

By adopting the above technical solution, the shapes and materials of the shielding tube are not limited in the present application, provided that it has shielding effect.

In some embodiments, the ceramic antenna includes a ceramic substrate and an antenna metal layer provided on the ceramic substrate.

In some embodiments, the temperature measuring probe with the BLUETOOTH® connectivity further includes an anti-disengagement buckle, in which a groove is formed in the inner wall of the needle tube at the tail end thereof; the anti-disengagement buckle is inserted into the groove so as to be fixedly connected to the needle tube; and the anti-disengagement buckle is sleeved on the shielding tube and fixedly connected to the shielding tube.

By adopting the above technical solution, the shielding tube also serves as a structural member connecting the needle tube to the handle. The anti-disengagement buckle is fixedly connected to the shielding tube at first, and then snapped into the groove of the needle tube, that is, the needle tube is fixed to the shielding tube at a head end thereof.

In some embodiments, the anti-disengagement buckle is fixedly connected to the shielding tube by glue.

In some embodiments, the anti-disengagement buckle includes an annular base and a plurality of elastic cantilevers provided on the annular base; and a bump is protruded out of the elastic cantilevers at a head end thereof; and configured to cooperate with the groove of the needle tube.

By adopting the above technical solution, the elastic cantilevers will be pressed inward and deform elastically when the anti-disengagement buckle is installed on the needle tube. The elastic cantilevers restore the elastic deformation outward to achieve a snap connection between the buckle and the groove when the buckle reaches the groove, thereby the needle tube is fixedly connected to the shielding tube, and the both will not be easily separated from each other.

In some embodiments, the shielding tube has an external thread at a central part thereof; the handle has an internal thread in an inner wall thereof; and the handle is in thread connection with the shielding tube.

By adopting the above technical solution, the handle can be stably connected to the shielding tube.

In some embodiments, the handle is provided at the tail end thereof with a charging metal head; the ceramic antenna is provided with a charging line; the charging line and the antenna metal layer are separately provided on two opposite surfaces of the ceramic substrate; the charging metal head is electrically connected to the charging line on the ceramic antenna; the charging line on the ceramic antenna is also electrically connected to the PCB board; a elastic tab is provided on the PCB board; the needle tube is electrically connected to the PCB board via the elastic tab; and the charging metal head and the needle tube serve as a positive electrode and a negative electrode of a charging circuit, respectively.

By adopting the above technical solution, a power-supply module can be charged. Further, the charging line and the antenna metal layer of the present application are separately arranged at two opposite surfaces of the ceramic substrate, which takes full advantage of the insulation performance of the ceramic substrate, so that the charging line and the antenna metal layer do not influence each other, and the performance of the antenna is not influenced when charging.

In some embodiments, the temperature measuring probe with the BLUETOOTH® connectivity further includes a second temperature sensor for measuring an environmental temperature and electrically connected to the PCB board; an accommodation hole is formed in the charging metal head at an inner end thereof; and the second temperature sensor is provided in the accommodation hole.

By adopting the above technical solution, the charging metal head is made of metal materials with good heat conduction and good heat dissipation effect, the temperature of which is substantially consistent with an environmental temperature, and the environmental temperature can be measured more accurately.

In summary, the present application can achieve at least one of the following technical effects:
1. The present application adopts the ceramic antenna to replace the current FPC antenna. The ceramic antenna has an advantage of high temperature resistance, and is able to work under a high temperature condition for a long time, but still ensures a work stability. Further, the ceramic antenna has advantages of high gain and high sensitivity;
2. The ceramic antenna has a head end extending into the needle tube and being electrically connected to the PCB board and a tail end extending into the handle. Moreover, the handle is generally made of materials with poor shielding effects such as ceramic, so as to avoid a great influence on receiving and transmitting signals for realizing the antenna function;
3. The arranged shielding tube plays a role of ground in the antenna system. A length of the antenna part that functions can be changed by adjusting a length of the shielding tube, thereby the performance of the antenna is changed, so that the antenna achieves a high efficiency and a good consistency; and
4. The shielding tube also serves as a structural member connecting the needle tube to the handle, thereby realizing a stable connection between the handle and the shielding tube.

DETAILED DESCRIPTION

The present application is further described in detail below in combination with the FIGS. 1-12.

Figure 1:
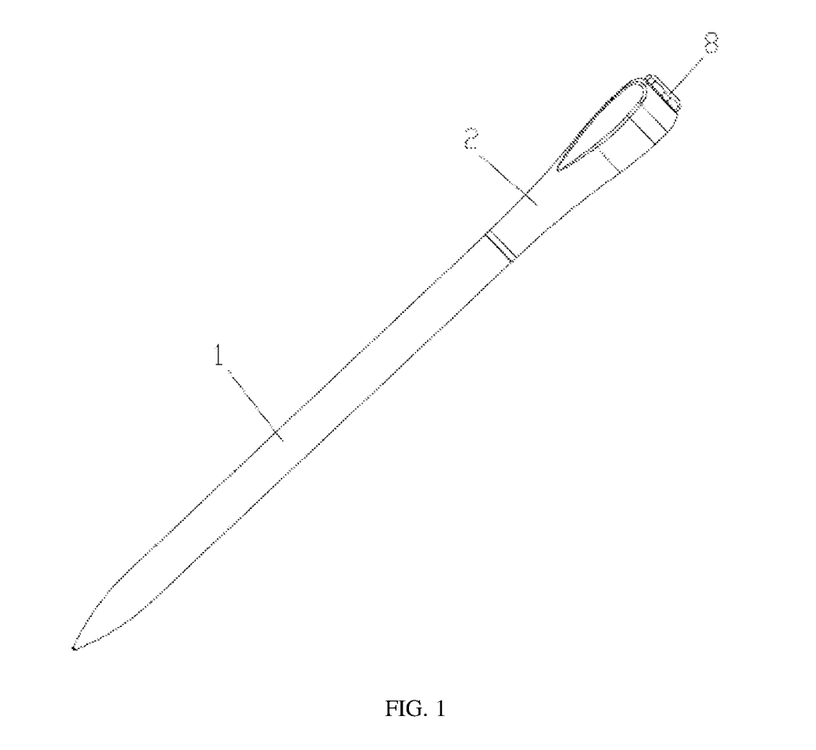
FIG. 1 illustrates a stereogram of a temperature measuring probe according to an embodiment of the present application.
Figure 2:
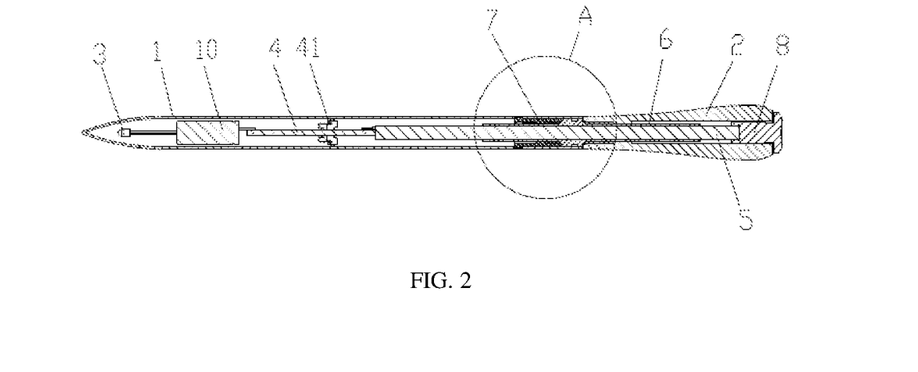
FIG. 2 illustrates a semi-section schematic diagram of a temperature measuring probe according to an embodiment of the present application.
Figure 3:
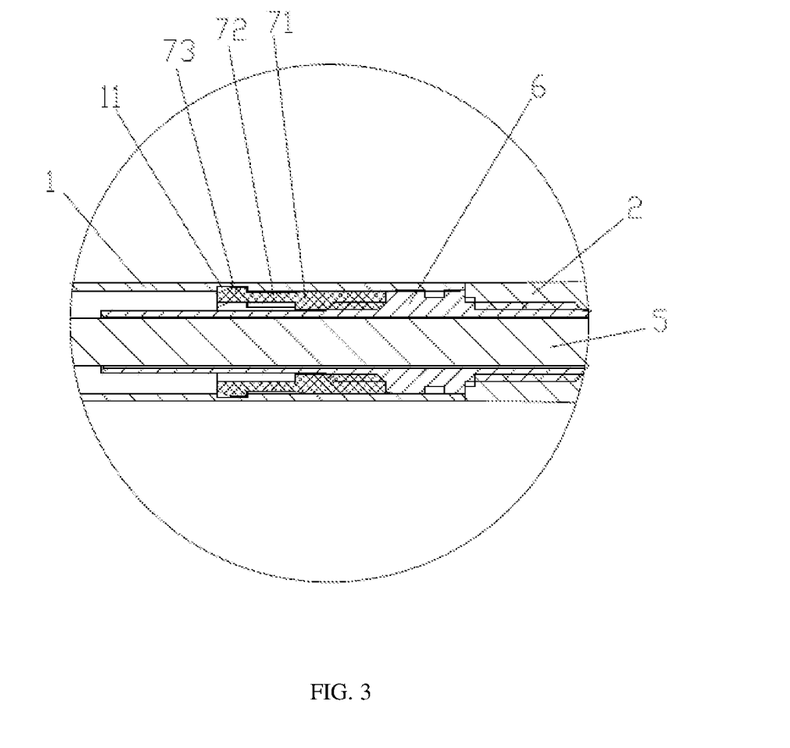
FIG. 3 illustrates an enlarged diagram at A of FIG. 2.
Figure 4:
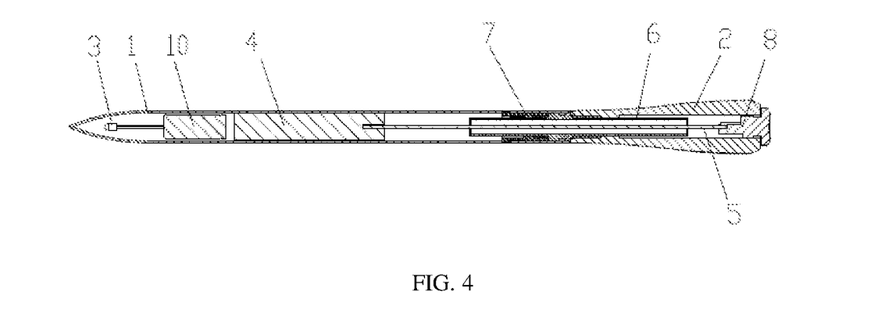
FIG. 4 illustrates a semi-section schematic diagram of a temperature measuring probe from another perspective according to an embodiment of the present application.
Figure 5:
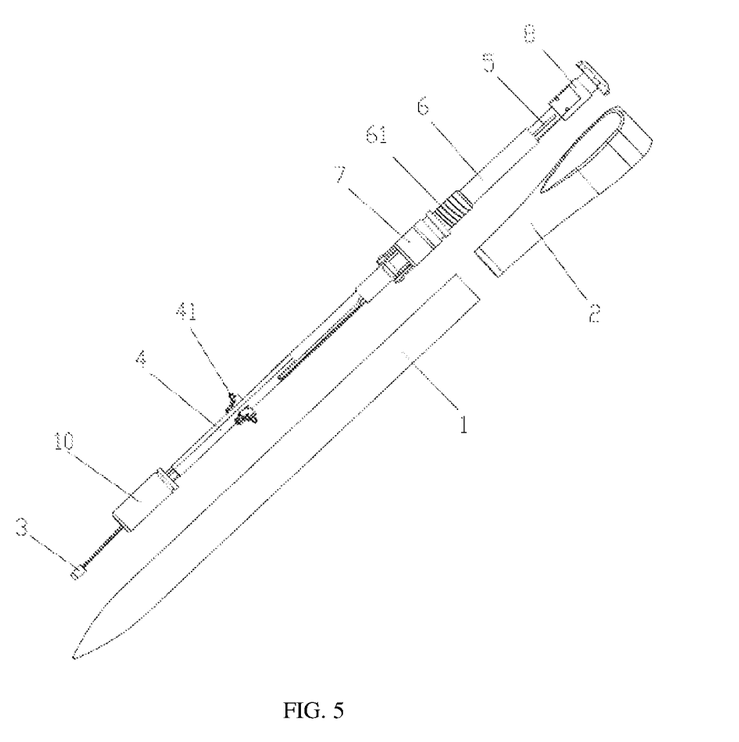
FIG. 5 illustrates an exploded-structural schematic diagram of a temperature measuring probe according to an embodiment of the present application.

Referring to FIGS. 1-3, an embodiment of the present application discloses a temperature measuring probe with BLUETOOTH® connectivity, including a needle tube 1, a handle 2, a first temperature sensor 3, a PCB board 4 and a ceramic antenna 5. The first temperature sensor 3 and the PCB board 4 are both provided in the needle tube 1, and the handle 2 is fixedly connected to a tail end of the needle tube 1. The ceramic antenna 5 is provided inside the needle tube 1 and the handle 2. The ceramic antenna 5 has a head end extending into the needle tube 1 and being electrically connected to the PCB board 4 and a tail end extending into the handle 2 to receive and transmit a signal, so as to realize an antenna function. The ceramic antenna 5 in the present application includes a ceramic substrate 51 and an antenna metal layer 52 arranged on the ceramic substrate 51.

The present application adopts the ceramic antenna 5 to replace the current FPC antenna. The ceramic antenna 5 has an advantage of high temperature resistance, and is able to work under a high temperature condition for a long time, but still ensures a work stability. Further, the ceramic antenna has advantages of high gain and high sensitivity. The ceramic antenna 5 has a head end extending into the needle tube 1 and being electrically connected to the PCB board 4 and a tail end extending into the handle 2. Moreover, the handle 2 is generally made of materials with poor shielding effect such as ceramic, so as to avoid a great influence on receiving and transmitting signals of the ceramic antenna 5 for realizing the antenna function.

Generally, the internal antenna needs to be designed and debugged in combination with the dielectric constants of surrounding materials in a specific environment where the internal antenna is used. Most of the internal antennas need custom design, and have poor commonality and long development period.

Figure 7:
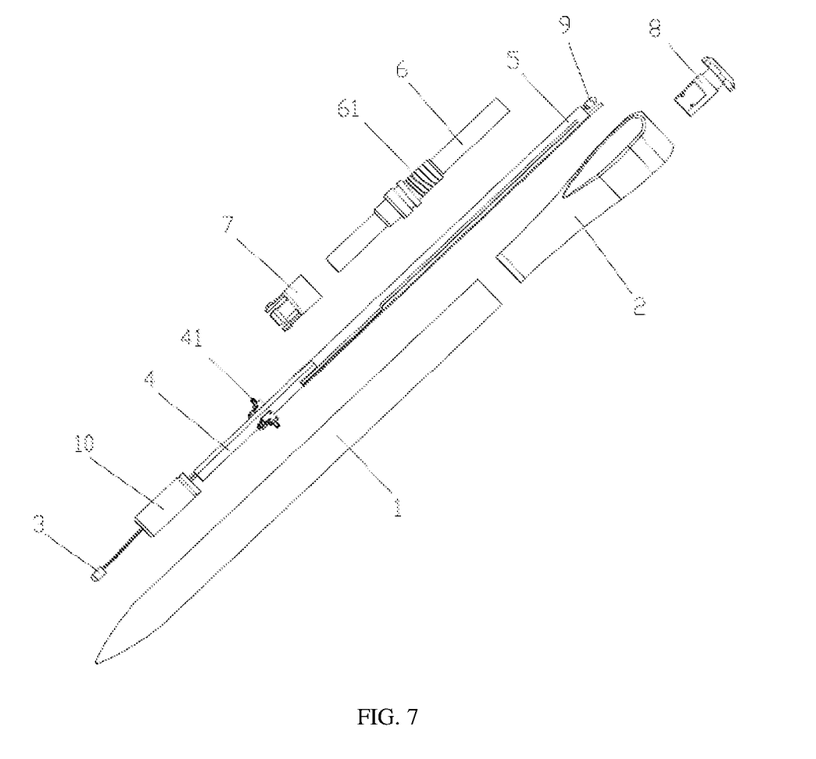
FIG. 7 illustrates a further exploded-structural schematic diagram of a temperature measuring probe according to an embodiment of the present application.
Figure 8:
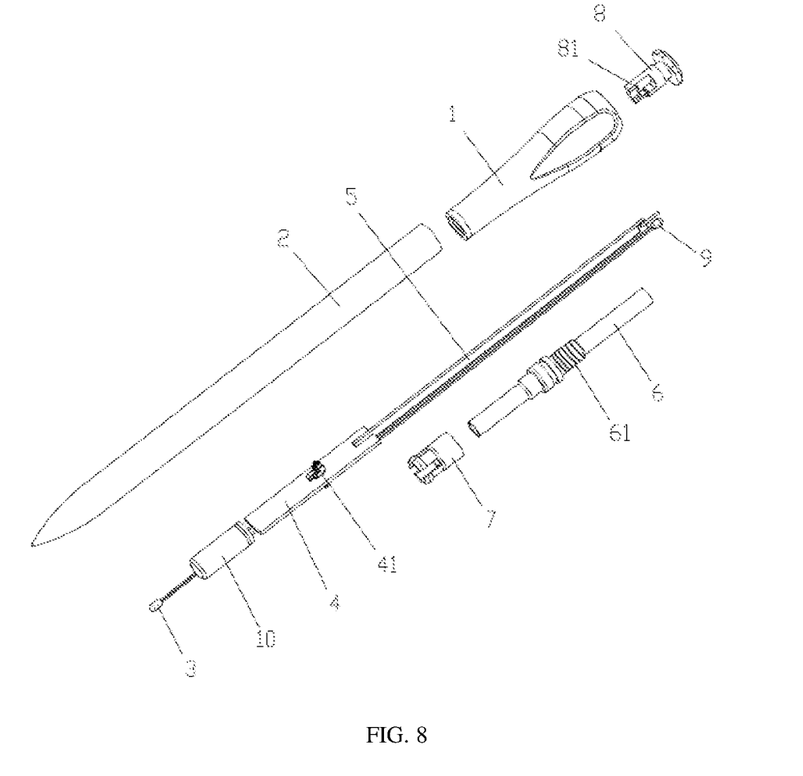
FIG. 8 illustrates a further exploded-structural schematic diagram of a temperature measuring probe from another perspective according to an embodiment of the present application.

Referring to FIGS. 7-8, the temperature measuring probe with the BLUETOOTH® connectivity further includes a shielding tube 6 arranged inside the needle tube 1 and the handle 2 and sleeved on the ceramic antenna 5; and has a head end extending into the needle tube 1 and a tail end extending into the handle 2; and the tail end of the ceramic antenna 5 extends beyond the shielding tube 6, especially the antenna metal layer 52 is configured to extend beyond the shielding tube 6, to receive and transmit a signal, so as to realize the antenna function. The shielding tube 6 plays a role of ground in an antenna system. A length of the ceramic antenna 5 part that functions can be changed by adjusting a length of the shielding tube 6, thereby the performance of the antenna is changed, so that the antenna achieves a high efficiency and a good consistency. The temperature measuring probe with the BLUETOOTH® connectivity with different specifications and types can adopt the same type of ceramic antenna 5 by only adjusting the length of the shielding tube 6, which achieves a good commonality and a short development period.

A cross-section shape of the shielding tube 6 may be various shapes such as a circle, an oval or a polygon, and the shielding tube may be various metal tubes such as a stainless steel shielding tube, a copper shielding tube or an aluminum shielding tube.

Referring to FIGS. 7-8, the temperature measuring probe with the BLUETOOTH® connectivity further includes an anti-disengagement buckle 7, in which a groove 11 is formed in the inner wall of the needle tube 1 at the tail end thereof; the anti-disengagement buckle 7 is inserted into the groove 11 so as to be fixedly connected to the needle tube 1; and the anti-disengagement buckle 7 is sleeved on the shielding tube 6 and fixedly connected to the shielding tube 6. In an embodiment, the shielding tube 6 also serves as a structural member connecting the needle tube 1 to the handle 2, so it needs to use a hard metal tube. The anti-disengagement buckle 7 is fixedly connected to the shielding tube 6 by glue at first, and then snapped into the groove 11 of the needle tube 1, that is, the needle tube 1 is fixed to a head end of the shielding tube 6. After that, the handle 2 is fixedly connected to the tail end of the shielding tube 6 by threaded connection, so that the handle 2 is fixedly connected to the needle tube 1 indirectly.

Figure 11:
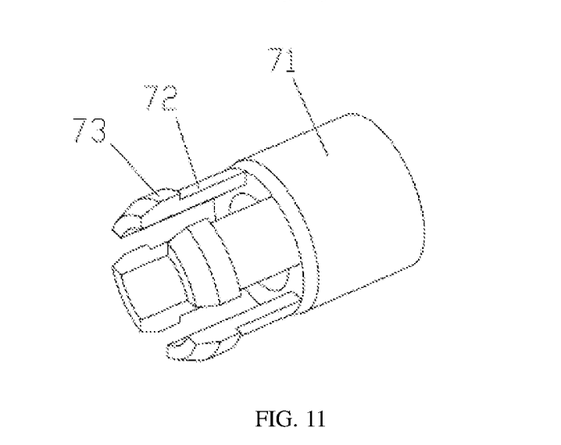
FIG. 11 illustrates a stereogram of an anti-disengagement buckle according to an embodiment of the present application.
Figure 12:
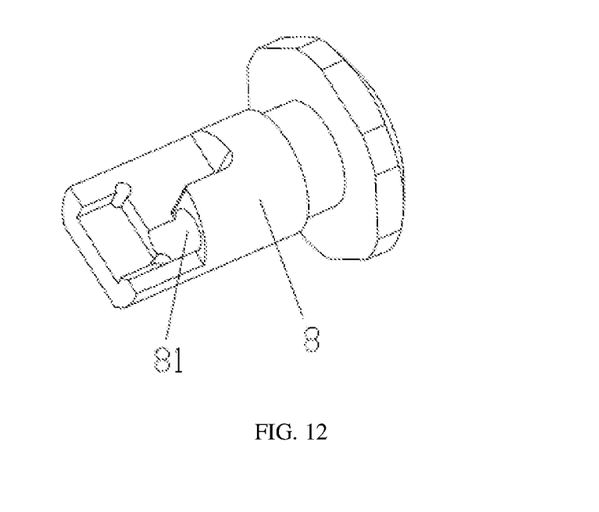
FIG. 12 illustrates a stereogram of a charging metal head according to an embodiment of the present application.

Referring to FIG. 3 and FIG. 11, the anti-disengagement buckle 7 includes an annular base 71 and a plurality of elastic cantilevers 72 provided on the annular base 71 and a bump is protruded out of the elastic cantilevers at a head end thereof; and configured to cooperate with the groove 11 of the needle tube 1. The elastic cantilevers 72 will be pressed inward and deform elastically when the anti-disengagement buckle 7 is installed on the needle tube 1. The elastic cantilevers 72 restore the elastic deformation outward to achieve a snap connection between the bump 73 and the groove 11 when the bump 73 reaches the groove 11, thereby the needle tube 1 is fixedly connected to the shielding tube 6, and the both will not be easily separated separating from each other.

Figure 6:
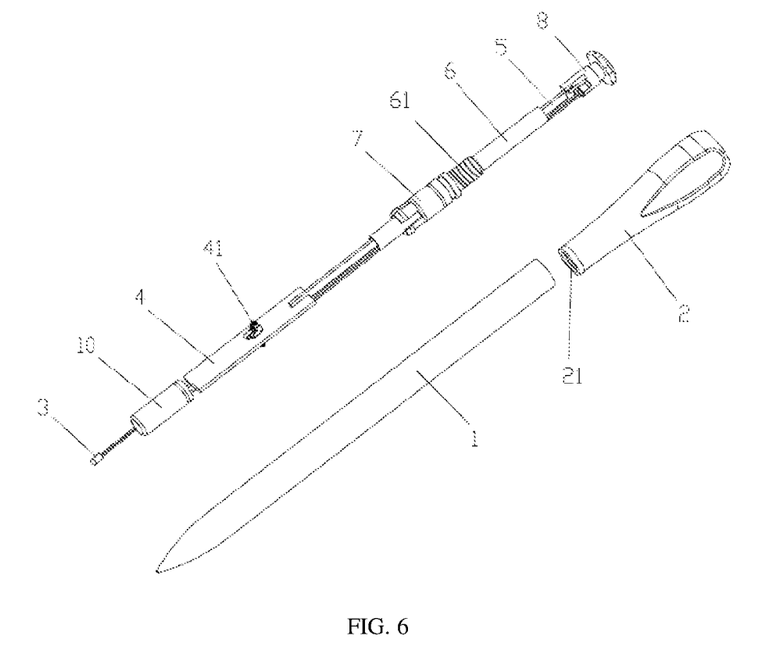
FIG. 6 illustrates an exploded-structural schematic diagram of a temperature measuring probe from another perspective according to an embodiment of the present application.

Referring to FIG. 6, the shielding tube 6 has an external thread 61 at a central part thereof; the handle 2 has an internal thread 21 in an inner wall thereof; and the handle 2 is in thread connection with the shielding tube 6 to realize a stable connection between the handle 2 and the shielding tube 6.

A power-supply module 10 is needed to be arranged inside the temperature measuring probe with the BLUETOOTH® connectivity for supplying power to the temperature measuring probe with the BLUETOOTH® connectivity when it works. The power-supply module 10 is electrically connected to the PCB board 4, so the power-supply module 10 needs to be charged.

Referring to FIGS. 7-10, the handle 2 is provided at the tail end thereof with a charging metal head 8, the ceramic antenna 5 is arranged with a charging line 53. The charging metal head 8 is electrically connected to the charging line 53 of the ceramic antenna 5, and the charging line 53 of the ceramic antenna 5 is also electrically connected to the PCB board 4. A elastic tab is provided on the PCB board 4; the needle tube 1 is electrically connected to the PCB board 4 via the elastic tab 41; and the charging metal head 8 and the needle tube 1 serve as a positive electrode and a negative electrode of the charging circuit, respectively. The power-supply module 10 is charged by the PCB board 4.

Figure 9:
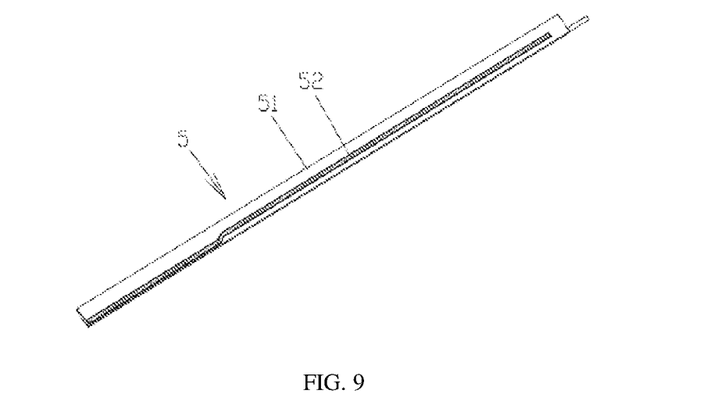
FIG. 9 illustrates a stereogram of a ceramic antenna according to an embodiment of the present application.
Figure 10:
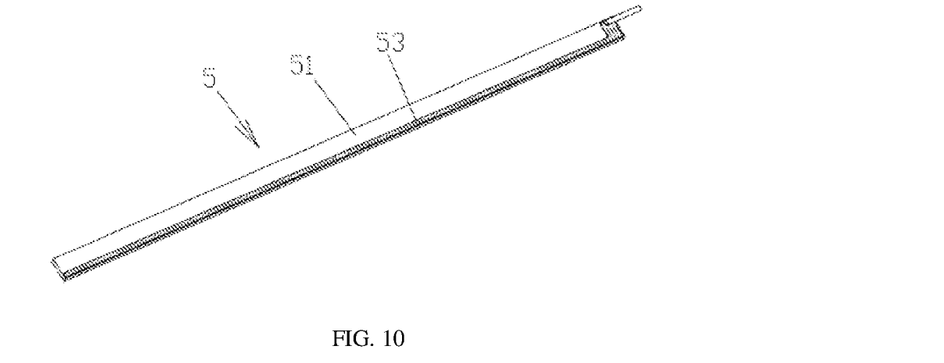
FIG. 10 illustrates a stereogram of a ceramic antenna from another perspective according to an embodiment of the present application.

In the traditional technical solution, the antenna is also used as a charging circuit, such that the service life of the antenna is seriously affected, and the performance of the antenna is easily affected as well. The charging line 53 and the antenna metal layer 52 of the present application are separately arranged at two opposite surfaces of the ceramic substrate 51, which takes full advantage of the insulation performance of the ceramic substrate 51, so that the charging line 53 and the antenna metal layer 52 do not influence each other, and the performance and the service life of the antenna are not influenced when charging.

Referring to the FIG. 8, the temperature measuring probe with the BLUETOOTH® connectivity further includes a second temperature sensor 9 for measuring an environmental temperature and electrically connected to the PCB board 4; an accommodation hole 81 is formed in the charging metal head 8 at an inner end thereof; and the second temperature sensor 9 is provided in the accommodation hole 81. The charging metal head 8 is made of metal materials with good heat conduction and good heat dissipation effect, the temperature of which is substantially consistent with an environmental temperature, and the environmental temperature can be measured more accurately.

The above are the preferred embodiments of the present application, which are not intended to limit the protection scope of the present application. Therefore, all equivalent changes made according to the structure, shape and principle of the present application should be covered within the protection scope of the present application.

What is claimed is:

1. A temperature measuring probe, comprising a needle tube, a handle, a first temperature sensor and a printed circuit board (PCB), wherein the first temperature sensor and the PCB are both provided in the needle tube, the handle is fixedly connected to a tail end of the needle tube, the temperature measuring probe further comprises a ceramic antenna provided inside the needle tube and the handle and having a head end extending into the needle tube and being electrically connected to the PCB and a tail end extending into the handle to receive and transmit a signal, so as to realize an antenna function, wherein the temperature measuring probe further comprises a shielding tube, the shielding tube is arranged inside the needle tube and the handle and sleeved on the ceramic antenna, the shielding tube has a head end extending into the needle tube and a tail end extending into the handle, and the tail end of the ceramic antenna extends beyond the shielding tube to receive and transmit the signal, so as to realize the antenna function, and wherein, the temperature measuring probe further comprises an anti-disengagement buckle, a groove is formed in an inner wall of the needle tube at the tail end of the needle tube, the anti-disengagement buckle is inserted into the groove so as to be fixedly connected to the needle tube, and the anti-disengagement buckle is sleeved on the shielding tube and fixedly connected to the shielding tube.

2. The temperature measuring probe according to claim 1, wherein, the shielding tube has a cross-sectional shape of a circle, an oval or a polygon, and the shielding tube is a stainless steel shielding tube, a copper shielding tube or an aluminum shielding tube.

3. The temperature measuring probe according to claim 1, wherein, the ceramic antenna comprises a ceramic substrate and an antenna metal layer provided on the ceramic substrate.

4. The temperature measuring probe according to claim 3, wherein, the handle is provided at a tail end of the handle with a charging metal head, the ceramic antenna is provided with a charging line, the charging line and the antenna metal layer are separately provided on two opposite surfaces of the ceramic substrate, the charging metal head is electrically connected to the charging line on the ceramic antenna, the charging line on the ceramic antenna is also electrically connected to the PCB, an elastic tab is provided on the PCB, the needle tube is electrically connected to the PCB via the elastic tab, and the charging metal head and the needle tube serve as a positive electrode and a negative electrode of a charging circuit, respectively.

5. The temperature measuring probe according to claim 4, wherein, the temperature measuring probe further comprises a second temperature sensor for measuring an environmental temperature and electrically connected to the PCB, an accommodation hole is formed in the charging metal head at an inner end of the charging metal head, and the second temperature sensor is provided in the accommodation hole.

6. The temperature measuring probe according to claim 1, wherein, the anti-disengagement buckle is fixedly connected to the shielding tube by glue.

7. The temperature measuring probe according to claim 1, wherein, the anti-disengagement buckle comprises an annular base and a plurality of elastic cantilevers provided on the annular base, a bump protrudes out of the plurality of elastic cantilevers at head ends of the plurality of elastic cantilevers, and the bump is configured to cooperate with the groove of the needle tube.

8. The temperature measuring probe according to claim 1, wherein, the shielding tube has an external thread at a central part of the shielding tube, the handle has an internal thread in an inner wall of the handle, and the handle is in thread connection with the shielding tube.

* * * * *